US009264643B1

(12) United States Patent
Xue

(10) Patent No.: US 9,264,643 B1
(45) Date of Patent: Feb. 16, 2016

(54) METHODS AND CIRCUITRIES FOR PIXEL SAMPLING

(71) Applicant: Rambus Inc., Sunnyvale, CA (US)

(72) Inventor: Song Xue, San Jose, CA (US)

(73) Assignee: RAMBUS, Inc., Sunnyvale, CA (US)

( * ) Notice: Subject to any disclaimer, the term of this patent is extended or adjusted under 35 U.S.C. 154(b) by 0 days.

(21) Appl. No.: 14/140,618

(22) Filed: Dec. 26, 2013

Related U.S. Application Data

(60) Provisional application No. 61/747,285, filed on Dec. 29, 2012.

(51) Int. Cl.
*H04N 5/378* (2011.01)

(52) U.S. Cl.
CPC .................................... *H04N 5/378* (2013.01)

(58) Field of Classification Search
CPC ...... H04N 5/374; H04N 5/378; H04N 5/3741
USPC .................................................. 348/301–308
See application file for complete search history.

(56) References Cited

U.S. PATENT DOCUMENTS

| 6,252,536 | B1  | 6/2001  | Johnson et al. | |
|---|---|---|---|---|
| 6,304,505 | B1  | 10/2001 | Forbes et al. | |
| 6,529,237 | B1* | 3/2003  | Tsay et al. | 348/241 |
| 2001/0002045 | A1* | 5/2001 | Fossum et al. | 257/1 |
| 2010/0194956 | A1  | 8/2010  | Yuan et al. | |

OTHER PUBLICATIONS

Coghill, John, "Digital Imaging: Technology 101," DALSA Corporation, 2003, pp. 1-23. 23 Pages.
Coghill, John, "Digital Imaging: Technology 101," DALSA Corporation, 2003, 24-47. 24 Pages.
Danchiv et al., "A Fully Differential Switched Capacitor Amplifier Modelling and Parameter Evaluation," Infineon Technologies Romania, 2007. 6 pages.
De Witt et al., "A Common Gate Pinned Photodiode Pixel," on Semiconductor, Received Mar. 5, 2014. 4 pages.
Degerli et al., "Low-Power Autozeroed High-Speed Comparator for the Readout Chain of a CMOS Monolithic Active Pixel Sensor Based Vertex Detector," IEEE Transactions on Nuclear Science, vol. 50, No. 5, Oct. 2003, pp. 1709-1717. 9 pages.
Elzeftawi et al., "Design Challenges for Sense Amplifier and Wireless Link in High-Density Neural Recording Implants," IEEE, 2010, pp. 61-64. 4 pages.
Koklu et al., "A Switched Capacitor Fully Differential Correlated Double Sampling Circuit for CMOS Image Sensors," Swiss Federal Institute of Technology, 2011, pp. 113-116. 4 pages.

(Continued)

*Primary Examiner* — Christopher K Peterson
(74) *Attorney, Agent, or Firm* — Silicon Edge Law Group LLP; Mark P. Guidotti; Arthur J. Behiel

(57) ABSTRACT

Described is a multi-modal binary pixel sampling system incorporating a configurable sampler. The system includes an imaging pixel that outputs a series of reset and measurement values. The configurable sampler can extract image data from these values using correlated double sampling (CDS), non-correlated double sampling (NCDS), direct comparison sampling (DS), or a combination of these sampling modes. The configurable sampler is agile and may transition among modes during an exposure interval. Additional switches, storage elements, and reference nodes may be added to store additional measurements or calibration values.

15 Claims, 5 Drawing Sheets

(56) References Cited

OTHER PUBLICATIONS

Chae, Youngcheol et al., "A 2.1 M Pixels, 120 Frame/s CMOS Image Sensor With Column-Parallel With Delta Sigma ADC Architecture," IEEE Journal of Solid-State Circuits, vol. 46, No. 1, Jan. 2011. 12 pages.

Song, Bongsub et al., "An Autofocus With Global Shutter Using Offset-Free Frame Memory," IEEE Transactions on Circuits and Systems—II: Express Briefs, vol. 57, No. 11, Nov. 2010. 5 pages.

Xu, Ruoyu et al., "A 1500 fps Highly Sensitive 256×256 CMOS Imaging Sensor With In-Pixel Calibration," IEEE Journal of Solid-State Circuits, vol. 47, No. 6, Jun. 2012. 11 pages.

\* cited by examiner

US 9,264,643 B1

METHODS AND CIRCUITRIES FOR PIXEL SAMPLING

FIELD

The present invention relates to the fields of electronic image sensors and digital image processing.

BACKGROUND

In a conventional CMOS image sensor, an integrated circuit contains an array of pixel sensors, or "pixels," each pixel including a photodetector that develops an analog voltage change proportional to a number of photons striking the detector during an exposure interval. At the conclusion of the exposure interval, a voltage developed on the photodetector is typically amplified and delivered to an analog-to-digital converter (ADC), which digitizes the amplified voltage.

Pixel geometries have scaled downward as CMOS processing has improved, resulting in performance rivaling that of larger and more power-consumptive Charge Coupled Devices (CCD), which have been widely applied in imaging devices such as digital single lens reflex (DSLR) cameras and camcorders. CMOS devices, having lower cost and performance equivalent to CCDs, now enjoy widespread adoption in modern imaging devices including smart phones, web cameras, and DSLR cameras. Despite the widespread adoption of CMOS imaging sensors however, limitations in performance exist due to various noise sources and dynamic range constraints.

BRIEF DESCRIPTION OF THE DRAWINGS

The subject matter disclosed is illustrated by way of example, and not by way of limitation, in the figures of the accompanying drawings and in which like reference numerals refer to similar elements and in which.

DETAILED DESCRIPTION

Figure 1:
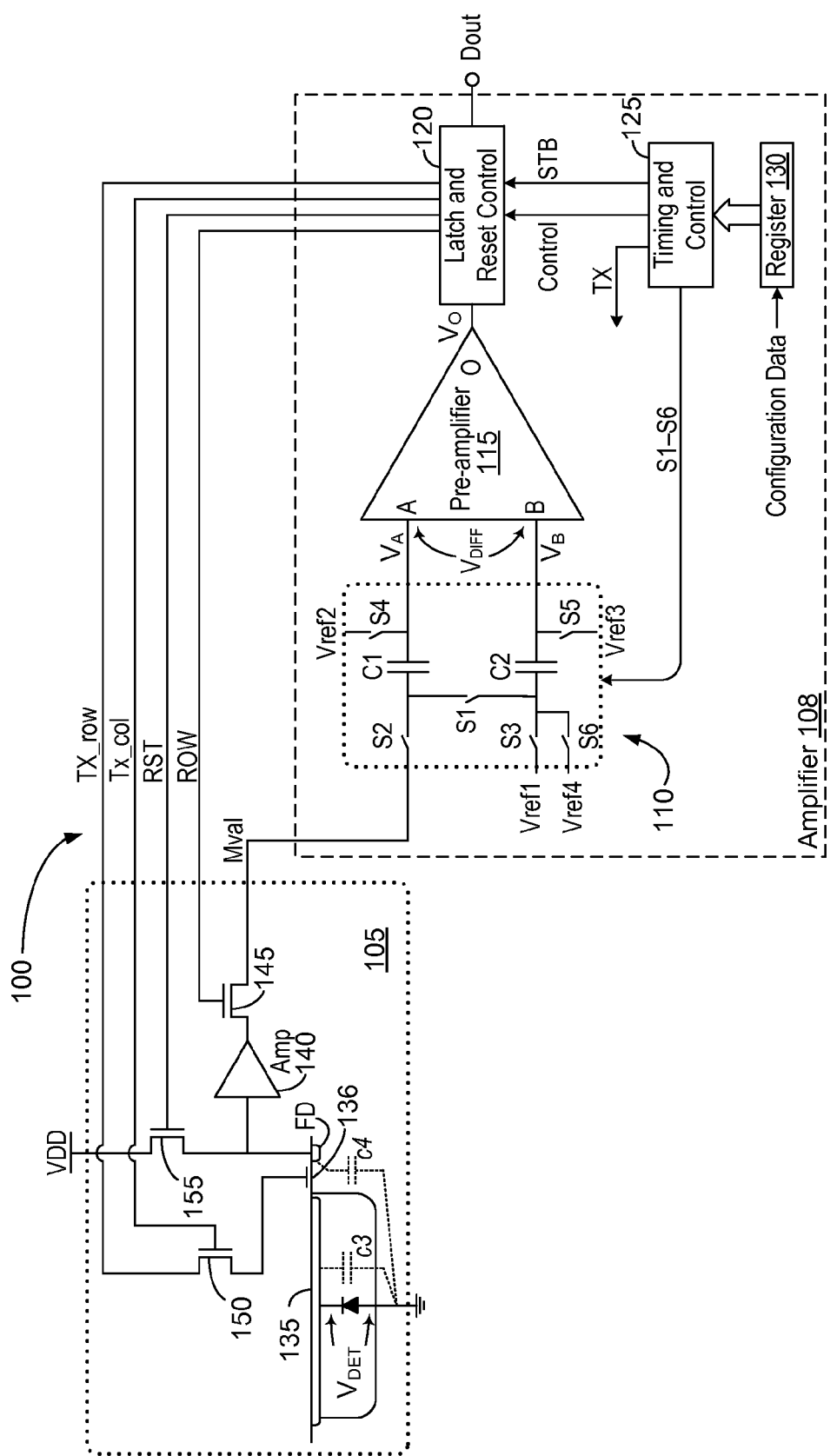
FIG. 1 depicts an embodiment of a sampling system comprising a photodetector, a configurable sampler, switches, storage elements, and a preamplifier together with circuitry to reset the photodetector, manage system operations, and communicate with a host processor (not shown)

FIG. 1 is a block diagram of an integrated circuit (IC) pixel sensor 100, in accordance with one embodiment, that supports relatively high dynamic ranges and reduced noise sensitivity. Pixel sensor 100 includes a photodetector 105 and an amplifier 108. Photodetector 105 responds to photon strikes from incident light and converts them into an electrical signal on an output node Mval when the photodetector 105 is selected for output. Amplifier 108 amplifies signal Mval, compares it to a reference, and produces a binary output signal Dout indicating whether Mval exceeds the reference. Amplifier 108 also manages the acquisition of image samples by controlling the assertion and timing of various control signals to photodetector 105. Amplifier 108 supports multiple modes of control to optimize the performance of pixel sensor 100 for different lighting and noise environments. Pixel sensor 100 may be one of an array of pixel sensors that together sense an image.

Pixel sensor 100 samples pixel outputs with respect to a binary threshold and produces a single-bit pixel output value, signal Dout. Assuming photodetector 105 is reset to a value indicative of a logic zero, signal Dout transitions to a logic one if light collected by photodetector 105 causes the signal on node Mval to exceed the threshold (where "exceed" can indicate going below the threshold for a photodetector with a voltage that decreases with photon strikes). As detailed below, a range of pixel intensities can be resolved by measuring how long it takes signal Mval to exceed the threshold. For example, signal Dout can be sampled periodically over an exposure interval, or "exposure," to determine how quickly signal Mval exceeds the threshold. In another embodiment, an exposure is divided into a number (e.g., 256) of differently timed measurement intervals. Amplifier 108 resets photodetector 105 at the start of each measurement interval and determines whether signal Dout transitions to logic one by the end. The minimum measurement interval for which signal Dout transitions to a logic one is then indicative of pixel intensity.

The threshold may be adjusted to alter the dynamic range of pixel sensor 100, e.g., a lower threshold yields a "1" output in the presence of fewer photon strikes. Measurement intervals may also be shortened to avoid saturation for high incident light, or lengthened to allow more photon strikes to be captured under low incident light conditions. Such adjustments can be made dynamically. Assuming, for example, that an exposure interval is divided into measurement intervals of increasing length, a high incident light measurement may cause signal Dout to assert logic "1" over the shortest of the measurement intervals, indicating to the host processor (not shown) that subsequent measurement intervals should be shortened to better resolve the intensity. Conversely, a low incident light measurement may induce the host processor to provide for relatively longer measurement intervals, or to integrate charge capture over multiple measurement intervals by foregoing pixel resets until, e.g., signal Dout transitions to logic one or the exposure interval ends.

Pixel sensor 100 supports different operational modes that give different tradeoffs between noise performance and dynamic range. In the first mode, correlated double sampling (CDS), amplifier 108 resets photodetector 105 after each measurement interval. A pixel's intensity is measured with reference to that pixel's reset value, which provides a degree of noise immunity. In the second mode, non-correlated double sampling (NCDS), photodetector 105 allows charge to accumulate on photodiode 135 over multiple measurement intervals during an exposure. As in CDS, a pixel's intensity is measured with reference to that pixel's reset value. NCDS pixel measurements are subject to different noise than the corresponding reset values, however, making NCDS measurements more sensitive to reset noise. The third mode, direct sampling (DS), is relatively simple but generally affords the least noise immunity of the three modes. In direct sampling, pixel intensity is measured with respect to a reference that is not derived from the pixel. Direct sampling can be accomplished for each measurement interval within an exposure interval, or can be used when integrating charge over multiple measurement intervals.

Each mode has characteristics and advantages depending on a given lighting condition. Pixel sensor 100 advantageously allows the host processor to transition among operational modes during or between exposure intervals, and thereby adapt to lighting conditions. Mode selection can be pixel specific, or can be common to one or more groups of pixels in an array.

Photodetector 105 includes a photodiode 135 that captures reset and measurement values $V_{DET}$ across a capacitance c3 that serves as a storage element. A second storage element, a capacitance c4 associated with a floating-diffusion node FD in photodetector 105, is sampled during reset events, as well as to form measurement values produced by photodiode 135 when the photodiode 135 is connected to node FD though a transfer gate 136. An amplifier 140 and transistor 145 present the reset and measurement values as signal Mval to amplifier 108 (the designation "Mval" refers both to a signal and an associated node. In general, whether a given moniker refers to a signal or a corresponding node will be clear from the context). A transistor 155 connects node FD to a voltage node VDD when a row signal RST is asserted, thereby resetting node FD. Another transistor 150, operated by a column transfer signal TX_col, applies a row transfer signal TX_row to transfer gate 136 when column transfer signal TX_col is asserted. When the transfer gate is opened, charge can flow between photodiode 135 and node FD. Signal lines ROW, TX_row, and RST are typically shared by other multiple photodetectors (not shown) in one or more rows of pixel sensors 100. Signal lines Mval and Tx_col are typically shared by other multiple photodetectors (not shown) in one or more columns of pixel sensors 100.

Amplifier 108 includes a sampler 110 that is configurable via switches S1 through S6, and storage elements (capacitors C1 and C2), to provide a difference signal $V_{DIFF}$, based on measurement values appearing on line Mval and several reference values appearing at reference nodes Vref1 through Vref4. Difference signal $V_{DIFF}$ is presented to nodes A and B of a preamplifier 115, which communicates with latch and reset control circuit 120. Upon receipt of a strobe signal STB from timing and control circuit 125, circuit 120 will make a single bit quantization for the sampling system and produce an output Dout. Based on the state of Dout (e.g., logic "1" or "0"), circuit 120 conditionally applies a reset function through Tx_col back to photodetector 105, completing a conditional reset loop. For a 4T pinned photodiode, a corresponding TX_row and RST signal will be applied to photodetector 105 so as to make a full sensor reset if Tx_col and Dout are asserted to logic 1. A timing and control circuit 125 sequentially controls configurable sampler 110, latch and reset control circuit 120, and it controls the sequencing of signals TX_row, TX_col, and RST, and the sequencing of switches S1 through S6. A register 130 communicates mode values to the timing and control circuit 125 to set the sample mode, and can be located via the host processor.

Photodetector 105 is sensitive to a number of noise sources. These include pixel-by-pixel black level variations known as "fixed pattern" noise. Such variations depend on each pixel's physical location within the sensor, and collectively appear as a pattern in sampled images. Another type of noise is introduced during pre-charge of a photodiode when it is reset to black level. This reset noise is temporal in that successive reset operations applied to the same photodiode result in varying respective reset values. When viewed as a time series, these varying reset values appear as random noise.

Figure 5:
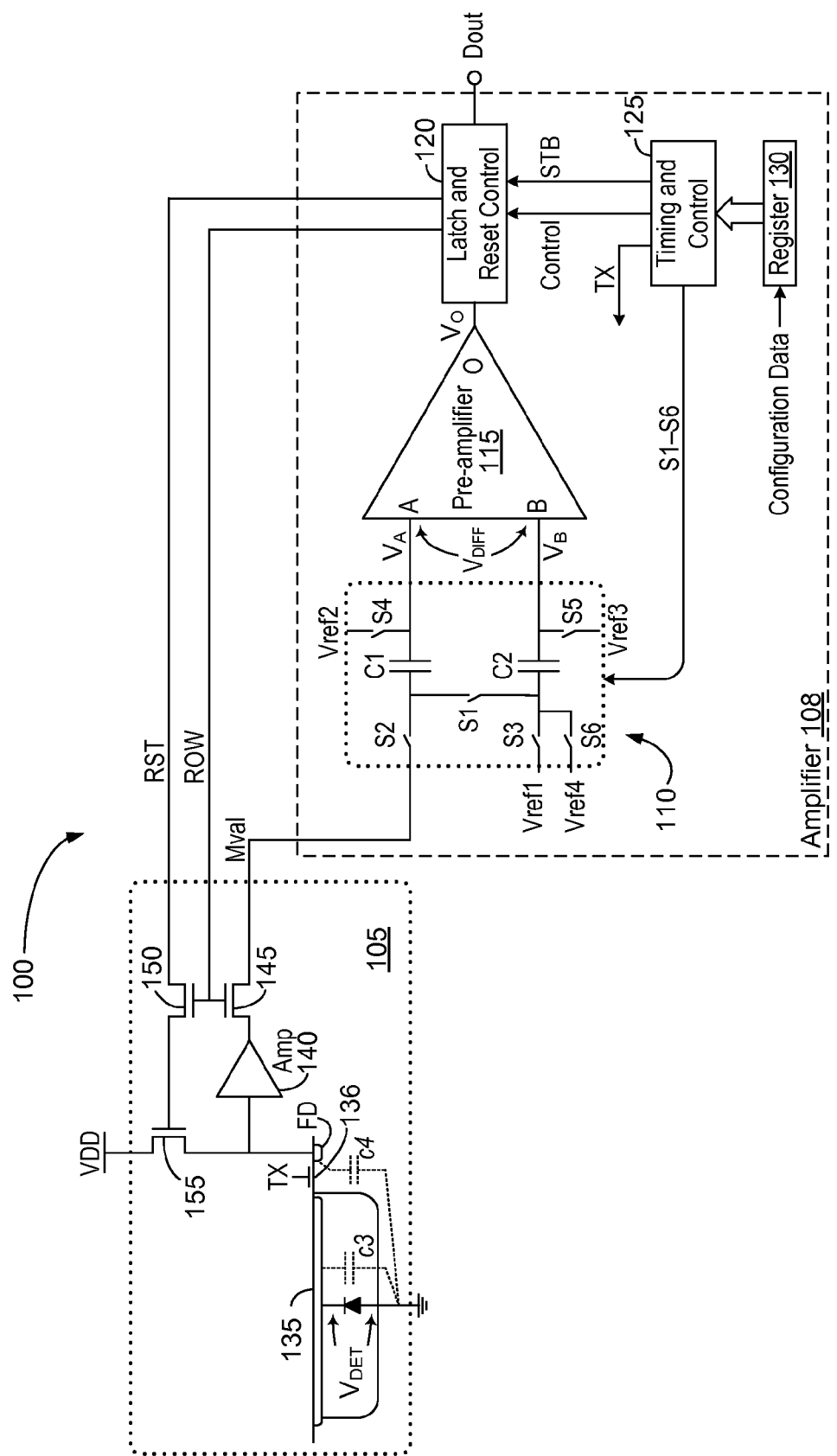
FIG. 5 depicts an alternate embodiment of the sampling system of FIG. 1 in which the photodetector is reset using different circuitry.

FIG. 5 depicts an alternate embodiment of the integrated circuit (IC) pixel sensor 100 of FIG. 1 in which the conditional reset loop that resets photodetector 105 utilizes only the ROW and RST signals. In this embodiment, amplifier 108 may be shared, for example, among a plurality of photodetectors 105 within a column of an image sensor array. In such an embodiment, only the ROW and RST signals of FIG. 1 are needed to reset photodetector 105.

In yet another embodiment (not shown), amplifier 108 may be dedicated to one photodetector 105 within an image sensor array. In such an embodiment, transistors 145 and 150, and the ROW signal, may be eliminated, and the RST signal may be coupled directly to the gate of transistor 150. The conditional reset loop is thereby simplified so that only the states of Dout and RST are needed to determine whether or not to reset photodetector 105.

Figure 2:
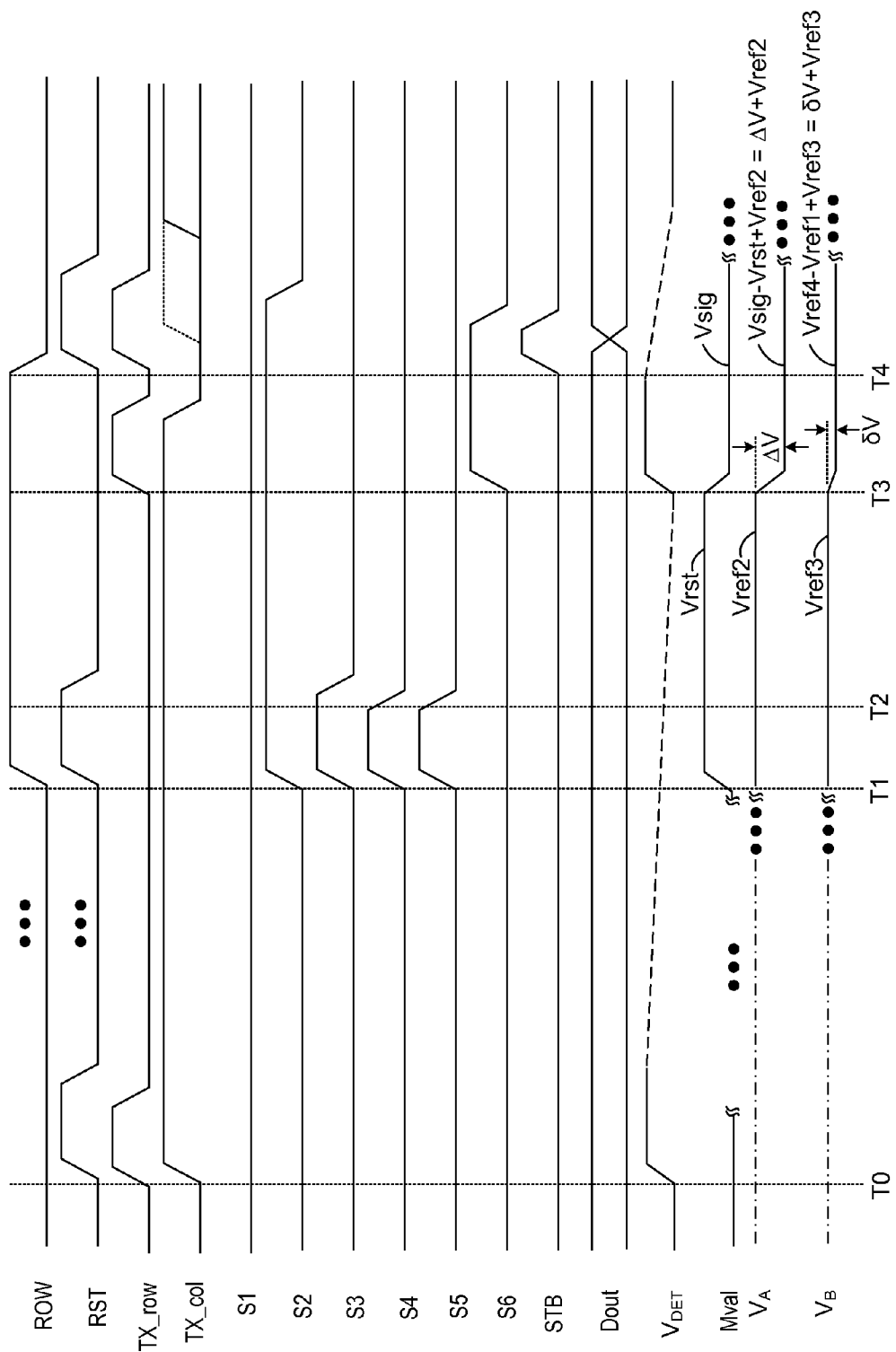
FIG. 2 is a timing diagram illustrating an exemplary operation of a sampling system configured to perform correlated double sampling of a photodetector.

FIG. 2 is a timing diagram illustrating the operation of pixel sensor 100 of FIG. 1 in the CDS mode, which compensates for both fixed-pattern and reset noise. Timing and control circuit 125, responsive to the appropriate mode value in register 130, determines the sequencing of signals TX_row, Tx_col, RST, switches S1 through S6 of configurable sampler 110, and conditionally resets photodetector 105.

As a preliminary matter, the host processor sets reference signals Vref2 and Vref3 to values calibrated to optimize the operating point of preamplifier 115. The host processor also sets signal Vref1 to an estimate of a reset measurement value, Vrst, appearing on line Mval at the output of photodetector 105 upon reset, and sets the value of signal Vref4 so that (Vref4−Vref1) becomes a binary detection threshold swing against which the output swing (Vsig−Vrst) of photodetector 105 is compared during the measurement interval. Pixel sensor 100 is thus prepared to take an intensity measurement.

At time T0, timing and control circuit 125 asserts a reset signal RST, a row transfer voltage signal TX_row, and a column transfer signal TX_col, thereby connecting voltage node VDD through transistor 155 to node FD and further through transfer gate 136 to photodiode 135, thereby resetting photodiode 135 such that the voltage of detection signal $V_{DET}$ is relatively high, representative of a "dark" pixel. Timing and control circuit 125 de-asserts signal TX_row to close transfer gate 136, and the first measurement interval of the exposure begins. Light incident on photodiode 135 is converted to collected charge in proportion to light intensity, so detection signal $V_{DET}$ tends to fall at a rate that is proportional to light intensity.

After a brief interval (shorter than a measurement interval), at time T1, signal ROW is enabled, at first without asserting signal TX_row. The signal at node FD is amplified (the amplification typically ranging from just less than 1 for a source follower amplifier to some multiple for a gain amplifier) by amplifier 140 and driven onto line Mval, and timing and control circuit 125 pulses signal RST to reset node FD. This begins the acquisition of a reset measurement value, Vrst, on line Mval that will be used as a reference against which to measure the detected pixel. Measurement value Vrst may be termed a "reset value" to distinguish it from prior or subsequent measurement values taken to acquire image data.

Also at time T1, timing and control circuit 125 asserts switches S2 through S5. Referring to FIG. 1, the input node of capacitor C1 is connected to line Mval through switch S2, and the output node of capacitor C1 is connected to node Vref2 through switch S4. Capacitor C1 charges to Vref2−Vrst. Capacitor C2, with its input node connected to node Vref1 through switch S3 and its output node connected to node Vref3 through switch S5, charges to Vref3−Vref1. Nodes A and B of preamplifier 115 respectively see signals $V_A$=Vref2 and $V_B$=Vref3. At time T2, timing and control circuit 125 de-asserts switches S3 through S5, de-asserting switch S3 slightly later than switch S5 to minimize charge injection into capacitor C2.

In another embodiment, these first measurements are taken before the measurement interval begins, for example at time T0, when photodetector 105 is reset. The signal at node FD can change over and between measurement intervals however, and capturing the reset value of this signal shortly before or after the pixel measurement is taken may allow amplifier 108 to reduce noise due to such drift.

At time T3, switch S6 is asserted to connect node Vref4 to the input node of capacitor C2, and signal TX_row is pulsed to transfer charge accumulated within photodiode 135 during the measurement interval to node FD. The signal on node FD is amplified by amplifier 140, directed through transistor 145 onto line Mval, and is reflected at the input node of capacitor C1 as a measurement value, Vsig. At that instant, the charge stored on capacitor C1 adds to Vsig, and the charge stored on capacitor C2 adds to Vref4, so that input nodes A and B of preamplifier 115 see the following measurement values:

$$V_A = Vsig - Vrst + Vref2 \quad (1)$$

$$V_B = Vref4 - Vref1 + Vref3 \quad (2)$$

The term (Vsig−Vrst) of equation (1), a first output derived from a reset value Vrst and an adjacent measurement value Vsig, is equal to the actual swing ΔV produced by photodetector 105 during the measurement interval. The term (Vref4−Vref1) of equation (2) is equal to the value of a reference swing, δV, representing the binary detection threshold swing against which ΔV is compared. Thus, equations (1) and (2) may be re-written as follows:

$$V_A = \Delta V + Vref2 \quad (3)$$

$$V_B = \delta V + Vref3 \quad (4)$$

The difference signal $V_{DIFF}$ appearing across nodes A and B of preamplifier 115 is therefore:

$$V_{DIFF} = (V_A - V_B) = (\Delta V - \delta V) + (Vref2 - Vref3) \quad (5)$$

Reference signals Vref2 and Vref3 may be independently adjusted to optimize the operating point of preamplifier 115, for example to set optimal common-mode levels at nodes A and B, or to compensate for offset errors within preamplifier 115. Assuming signals Vref2 and Vref3 are the same or similar (i.e., Vref2≈Vref3), their contribution to equation (5) may be ignored for purposes of comparing ΔV and δV. The equation expressing the response of preamplifier 115 to ΔV and δV then simply becomes:

$$V_O = G^*(V_A - V_B) = G^*(\Delta V - \delta V) \quad (6)$$

where G, the gain of preamplifier 115, is equal to unity, and $V_O$ (further derived from first output ΔV, Vref1, and Vref4) is a signal appearing at output node O of preamplifier 115. In another embodiment, G may be made arbitrarily large as will be obvious to one of ordinary skill in the art. $V_O$ will be >0 when ΔV (the actual photodetector swing) exceeds δV (the binary detection threshold swing).

Returning to FIGS. 1 and 2, just before time T4, the timing and control circuit 125 deasserts TX_col for all columns. At time T4, timing and control circuit 125 pulses signal STB, causing circuit 120 to capture the output from preamplifier 115, pulses signals TX_row and RST to reset the FD nodes for the row. If signal $V_O$ is >0 (that is, ΔV>δV), then signal TX_col will be asserted, photodiode 135 will be reset, and signal Dout will be asserted to logic 1. If signal $V_O$ is <0 however, TX_col will not be asserted until after TX_row is deasserted, photodiode 135 will not be reset, and signal Dout will be asserted to logic 0. The host processor notes the timing and value of signal Dout, or may note only when signal Dout is sampled as a logic one.

The reset of a 4T photodetector is destructive because the transfer of charge from photodiode 135 to node FD changes the sensed voltage. In situations of low incident light, CDS mode may not produce sufficient output to cross the binary pixel threshold within a measurement interval. In such an instance, for example after several measurement intervals in which Dout is asserted to zero, the host processor may switch to the NCDS or DS modes in which charge is integrated across measurement intervals.

Figure 3:
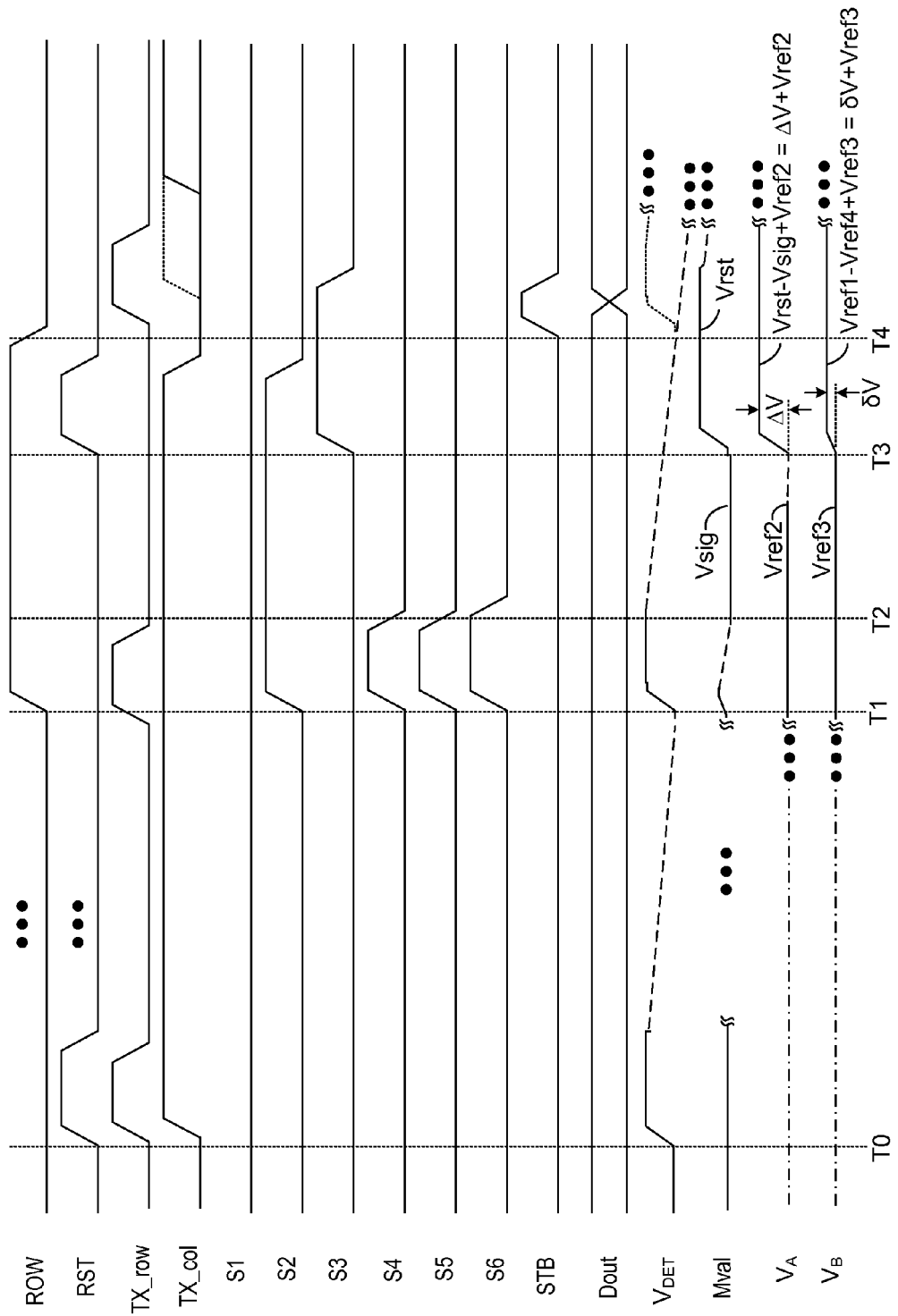
FIG. 3 is a timing diagram illustrating an exemplary operation of a sampling system configured to perform non-correlated double sampling of a photodetector.

FIG. 3 is a timing diagram illustrating the operation of pixel sensor 100 of FIG. 1 in the NCDS mode. As with CDS, NCDS compares ΔV (an actual photodetector swing) to δV (a binary detection threshold swing) and resets photodetector 105 if ΔV exceeds δV. The NCDS mode allows photodiode 135 to accumulate charge over multiple measurement intervals within a given exposure, and thus increase light sensitivity as compared with, e.g., the CDS mode.

FIG. 1 depicts a so-called four-transistor (4T) photodetector 105, which calls attention to transistors 145 and 155, and transfer gate 136 (the FIG. 1 embodiment has an additional fifth transistor 150 to allow pixel-selective reset). Other embodiments include a "3T photodiode," which omits transfer gate 136, and transistor 150 is moved such that it, along with RST, controls the operation of reset transistor 155. In such embodiments, temporal reset noise that is introduced by transistor 155 is not removed because node FD is not available in a 3T photodiode to sample and hold the temporal reset noise. In the NCDS example illustrated in connection with FIG. 3, the timing and control circuit 125 avoids resetting node FD between measurements that do not detect a threshold exceedance, so that photodiode 135 behaves as a 3T cell in support of the NCDS mode.

The host processor loads register 130 with configuration data to enable the NCDS mode. As explained in detail above with respect to CDS mode, the processor sets Vref1 and Vref4 so that (Vref4−Vref1) becomes the absolute value of a binary detection threshold swing against which the output swing of photodetector 105 is compared during the measurement interval (the swing may be different than in the FIG. 2 mode). The host processor also sets signals Vref2 and Vref3 to optimize the operating point of preamplifier 115.

As a preliminary matter, timing and control circuit 125 can assert signals TX_row and TX_col to logic 1, thereby placing photodiode 135 in substantially continuous communication with node FD (except during a conditional reset phase, explained below). Alternately, and as shown, TX_row is pulsed at the start of each measurement interval to transfer charge collected over the last measurement interval to node FD. At time T0, signals RST and TX_row are pulsed to reset photodetector 105, and the first measurement interval of an exposure begins. As before, detection signal $V_{ET}$ is reset high and falls during the measurement interval at a rate proportional to light intensity. At the conclusion of the measurement interval, time T1, signals TX_row and ROW, and switch S2, are asserted, such that a measurement value, Vsig, is transferred to node FD and driven onto line Mval by photodetector 105, and switches S4 through S6 are pulsed.

Referring to FIG. 1, line Mval from photodetector 105 is connected through switch S2 to the input node of capacitor C1, and Vref2 is connected through switch S4 to the output node of capacitor C1. Capacitor C1 charges to Vref2−Vsig. Vref4 is connected through switch S6 to the input node of capacitor C2, and Vref3 is connected through switch S5 to the output node of capacitor C2. Capacitor C2 charges to Vref3−Vref4. Nodes A and B of preamplifier 115 respectively see signals $V_A$=Vref2 and $V_B$=Vref3.

At time T2, timing and control circuit 125 de-asserts signal Tx_row and switches S4 through S6, de-asserting switch S6 slightly later than switch S5 to minimize charge injection into capacitor C2. De-assertion of switch S4 places node Mval in series with capacitor C1. At time T3, timing and control circuit 125 asserts signal RST and closes (asserts) switch S3, placing node Vref1 in series with capacitor C2. Floating diffusion FD is reset to a reset value, Vrst, node Vref1 is connected through switch S3 to capacitor C2, and nodes A and B of preamplifier 115 see the following signals $$V_A = Vrst - Vsig + Vref2 \quad (7)$$

$$V_B = Vref1 - Vref4 + Vref3 \quad (8)$$

The term (Vrst−Vsig) of equation (7), a second output derived from a measurement value and a reset value, represents the actual swing ΔV produced by photodetector 105 during the measurement interval plus reset noise, since the floating diffusion reset used in the difference is not the same reset that preceded the transfer of charge from the photodiode. The analysis for equations (7) and (8) is identical to the CDS mode analysis of equations (1) through (6) as detailed above, except that the measurement order of signals Vrst and Vsig, and signals Vref1 and Vref4, reverses the polarity of the comparison such that $V_O$ (further derived from second output ΔV, Vref4, and Vref1) is $$V_O = G^*(\delta V - \Delta V) \quad (9)$$

In other words, when the absolute value of ΔV (the actual photodetector swing) exceeds the absolute value of δV (the expected photodetector swing), signal $V_O$<0. Thus, in NCDS mode, latch and reset control circuit 120 introduces a simple logic inversion to signal $V_O$ received from preamplifier 115.

Returning to FIGS. 1 and 3, timing and control circuit 125 deasserts signal TX_col for each column prior to time T4, and at time T4 pulses signals STB and TX_row. If signal $V_O$ is <0 (absolute value of ΔV>δV) for a particular column, then signal TX_col is asserted for that column, photodiode 135 is reset, and signal Dout is asserted to logic 1. If signal $V_O$ is >0 however, signal TX_col for that column is not asserted until after the end of the TX_row pulse, photodiode 135 is not reset, and signal Dout is asserted to logic 0.

In situations in which successive measurement intervals yield excessive results that exist near the binary detection threshold (i.e., Dout alternates excessively between 0 and 1), the host processor may determine to reconfigure photodetector 105 to operate in 4T mode, and change the sampling mode to CDS, to improve noise performance.

Figure 4:
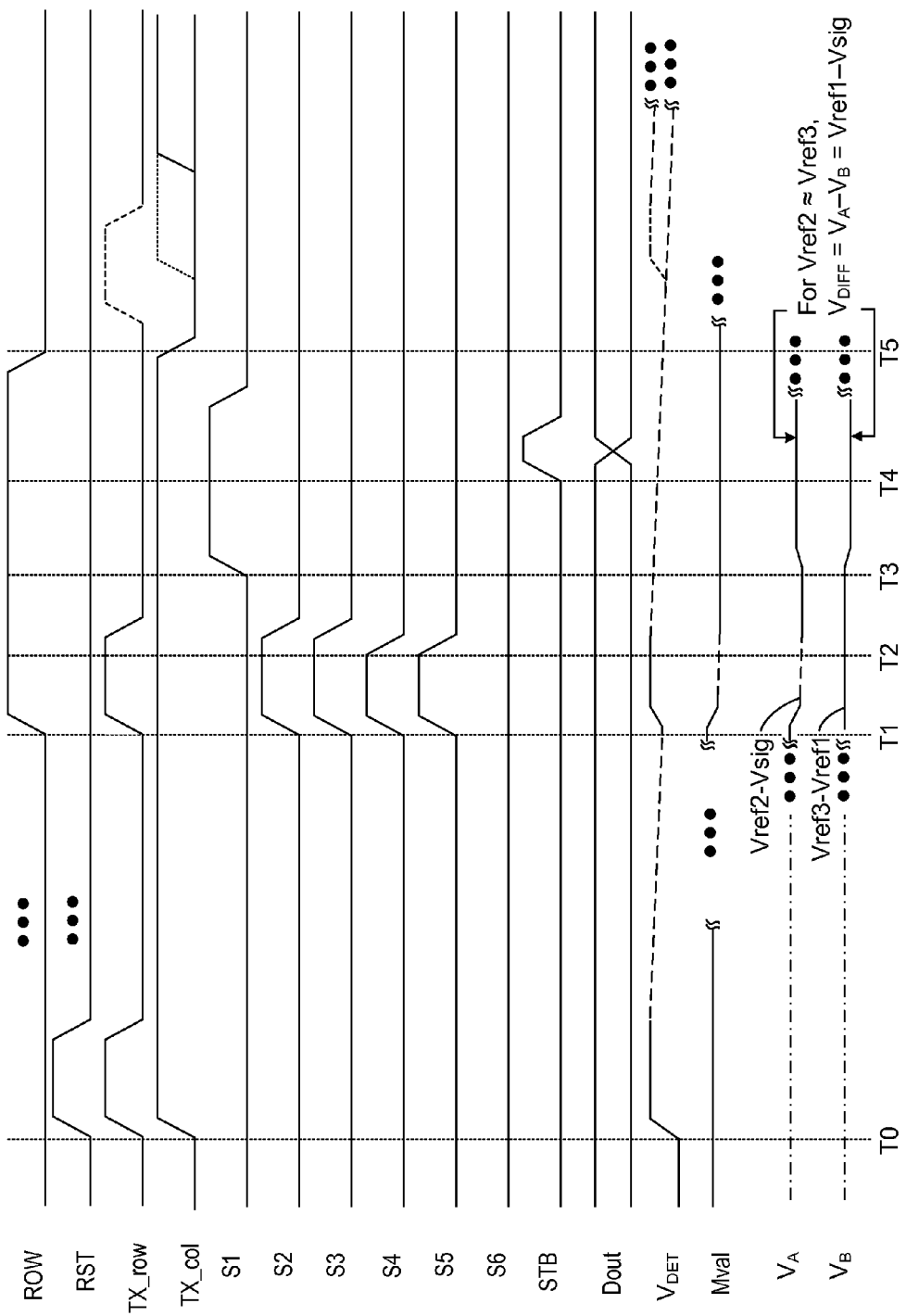
FIG. 4 is a timing diagram illustrating an exemplary operation of a sampling system configured to directly sample a photodetector.

FIG. 4 is a timing diagram illustrating the operation of pixel sensor 100 of FIG. 1 in a third sample mode, direct sampling (DS), to produce an output derived from measurement values and a reference value. Direct sampling is generally simpler but offers less noise immunity than either CDS or NCDS.

As described above in connection with NCDS measurements, photodiode 135 is configured to respond as a 3T photodiode. Signals Vref2 and Vref3 are calibrated to optimize the operating point of preamplifier 115, and signal Vref1 is set to a reference value. The host processor selects the DS mode by loading register 130 with the appropriate configuration data.

At time T0, timing and control circuit 125 asserts signal TX_col and pulses signals RST and TX_row to reset photodetector 105 so that signal $V_{ET}$ is initialized high. After a measurement interval (and optionally resetting floating diffusion FD, not shown), at time T1, timing and control circuit 125 asserts signals ROW, pulses TX_row, and pulses switches S2 through S5. Asserting switches S2 and S4 drives a measurement signal Vsig from photodetector 105 onto the input node of capacitor C1, and reference signal Vref2 to the output node of capacitor C1. Capacitor C1 thus charges to Vref2−Vsig. Node Vref1 is connected through switch S3 to input node of capacitor C2 and node Vref3 is connected through switch S5 to output node of capacitor C2. Capacitor C2 thus charges to Vref3−Vref1. Switches S2 to S5 are deasserted at time T2 to capture those sampled signals across capacitors C1 and C2, respectively.

At time T3, timing and control circuit 125 asserts switch S1, thereby connecting the input nodes of capacitors C1 and C2 together. Because switches S2 through S6 are open, nodes A and B across preamplifier 115 are presented with $V_{DIFF}$, the difference of the signals across capacitors C1 and C2 as follows $$V_{DIFF} = (Vref2 - Vsig) - (Vref3 - Vref1) = (Vref1 - Vsig) + (Vref2 - Vref3) \quad (10)$$

As explained above in relation to equation (5), the contribution of signals Vref2 and Vref3 to equation (10) may be ignored for purposes of comparing signals Vsig and Vref1. Preamplifier 115 therefore produces the following output $$V_O = G^*(Vref1 - Vsig) \quad (11)$$

The term (Vref1−Vsig) of equation (11) is a third output derived from measurement values and a reference value such that when Vsig>Vref1, $V_O$<0. As in mode NCDS, latch and reset control circuit 120 inverts the output of preamplifier 115 and asserts Dout to logic 1 when Vsig exceeds Vrst. Returning to FIGS. 1 and 4, timing and control circuit 125 pulses signal STB at time T4. If signal $V_O$ is <0 (Vsig>Vref1), then signal Dout will be asserted to logic 1. If signal $V_O$ is >0, signal Dout will be asserted to logic 0. In this mode, the timing and control circuit 125 determines whether to assert signal TX_row, as indicated by the dashed pulse in FIG. 4 at time T5, to reset the photodiode. Depending on the value of signal Dout at the conclusion of the measurement interval, the host processor may determine to transition to another of the supported modes.

Modern CMOS processing geometries facilitate pixel areas many times smaller (typically 4-100×) than traditionally sized pixels. The smaller footprint enables pixel density to scale, and results in greater sensitivity to low light levels (i.e., a small number of photon strikes yields usable output) but at the expense of low output levels and less inherent dynamic range relative to larger pixels. (The dynamic range of an image sensor is a measure of its ability to image bright and dark areas of a scene, and may be defined as the ratio of the largest non-saturating input signal to the smallest detectable input signal) The greater pixel densities now possible with smaller CMOS pixel geometries has enabled greater spatial resolution, however the larger number of resultant on-chip pixels, and lower outputs emanating from those pixels, make sampling via a traditional ADC more difficult. The design of pixel sensor 100 allows it to fit within modern CMOS pixel geometries, thereby enabling those pixels to be efficiently sampled. In some embodiments, amplifier 108 provides the difference voltage, or a similar signal, to a traditional ADC for conversion to a multibit value when Dout indicates that a threshold amount of charge has been collected by the photodetector.

While the present invention has been described in connection with specific embodiments, other embodiments are contemplated. For example, first and second measurements detailed above may be taken in reverse order and the sequencing and comparison steps may be easily adapted thereto.

Additional storage elements and switches may be added to increase the number of comparisons, or to store calibration data. Capacitors, reverse biased diodes, or charge coupled device (CCD) cells are examples of potential storage elements. Furthermore, the advantages provided by the binary pixel sensor depicted above can be extended to non-image signals, for example to read the contents of memory cells. Further variations will be obvious to those of ordinary skill in the art.

Moreover, some components are shown directly connected to one another while others are shown connected via intermediate components. In each instance the method of interconnection, or "coupling," establishes some desired electrical communication between two or more circuit nodes, or terminals. Such coupling may often be accomplished using a number of circuit configurations, as will be understood by those of skill in the art. Therefore, the spirit and scope of the appended claims should not be limited to the foregoing description. Only those claims specifically reciting "means for" or "step for" should be construed in the manner required under the sixth paragraph of 35 U.S.C. §112.

What is claimed is:

1. An integrated circuit imaging device comprising:
   a photodetector having a storage element operable to output a sequence of reset and measurement values; and
   a configurable sampler coupled to the storage element to sample the sequence of reset and measurement values within an exposure interval, the exposure interval encompassing a plurality of measurement intervals, the sampler supporting sample modes, including:
      a first sample mode operable to produce a first output derived from one of the reset values and an adjacent measurement value, the first sample mode operating in a first of the measurement intervals;
      a second sample mode operable to produce a second output derived from one of the measurement values and an adjacent reset value, the second sample mode operating in a second of the measurement intervals; and
      a transition mode operable to switch between the first and second sample modes responsive to at least one of the first and second outputs, the transition between the first and second sample modes occurring within the exposure interval.

2. The integrated circuit imaging device of claim 1, wherein the configurable sampler derives the second output from charge integrated across the photodetector in comparison to a reference.

3. The integrated circuit imaging device of claim 1, wherein the storage element is a floating diffusion.

4. The integrated circuit imaging device of claim 1, wherein the sampler supports a third sample mode operable to produce third outputs derived from comparison of one of the measurement values to a reference value.

5. The integrated circuit imaging device of claim 1, wherein at least one of the first and second outputs is further derived from a reference.

6. The integrated circuit imaging device of claim 5, wherein at least one of the first and second outputs is further derived from a second reference.

7. The integrated circuit imaging device of claim 1, further comprising a latch and reset control circuit disposed between the configurable sampler and the photodetector to conditionally reset the photodetector according to the one of the first and second outputs produced by the configurable sampler.

8. The integrated circuit imaging device of claim 7, further comprising a preamplifier disposed between the configurable sampler and the latch and reset control circuit.

9. The integrated circuit imaging device of claim 7, further comprising a timing and control circuit coupled to the configurable sampler and the latch and reset control circuit, the timing circuit supporting sequential control of the configurable sampler and the latch and reset control circuit.

10. An integrated circuit comprising:
    a photo-sensitive storage cell operable to provide a sequence of measurement values;
    a first analog storage element having an input and an output;
    a second analog storage element having an input and an output;
    a first switch disposed between the inputs of the first and second analog storage elements;
    a second switch disposed between the storage cell and the input of the first analog storage element, the first switch operable to selectively convey the measurement values;
    a reference node to receive a reference signal;
    a third switch disposed between the reference node and the input of the second analog storage element, the third switch operable to selectively convey the reference signal;
    a differential preamplifier having first and second complementary inputs respectively coupled to the outputs of the first and second analog storage elements; and
    a latch and reset control circuit disposed between an output of the preamplifier and the storage cell to conditionally reset the storage cell responsive to the preamplifier, wherein the conditional reset occurs within an exposure interval.

11. The integrated circuit of claim 10, wherein the storage cell comprises a photodetector selectively coupled to a floating diffusion.

12. The integrated circuit of claim 10, further comprising a timing and control circuit coupled to the first, second, and third switches, and further coupled to the latch and reset control circuit, the timing circuit supporting sequential control of the first, second, and third switches, and the reset control.

13. The integrated circuit of claim 10, further comprising:
    second and third reference nodes;
    a fourth switch connected between the second reference node and the output of the first analog storage element; and
    a fifth switch connected between the third reference node and the output of the second analog storage element.

14. The integrated circuit of claim 13, wherein the second and third reference nodes supply a common reference signal.

15. The integrated circuit of claim 14, further comprising a fourth reference node to receive a fourth reference signal and a sixth switch disposed between the fourth reference node and the input of the second analog storage element.

* * * * *